(12) United States Patent
Molnar et al.

(10) Patent No.: US 12,266,830 B2
(45) Date of Patent: Apr. 1, 2025

(54) CONTAINER DEPLOYMENT FROM VEHICLE

(71) Applicants: Hyundai Motor Company, Seoul (KR); Kia Corporation, Seoul (KR)

(72) Inventors: John Molnar, Farmington Hills, MI (US); Amanda Christiana, Ann Arbor, MI (US); Henry Teutsch, Detriot, MI (US); Victoria Delker, Farmington Hills, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 23 days.

(21) Appl. No.: 18/175,039

(22) Filed: Feb. 27, 2023

(65) Prior Publication Data

US 2024/0291004 A1 Aug. 29, 2024

(51) Int. Cl.
*H01M 8/04* (2016.01)
*B60L 50/72* (2019.01)
*H01M 8/04119* (2016.01)
*H01M 8/04291* (2016.01)
*A01K 7/00* (2006.01)
*B62D 25/20* (2006.01)

(52) U.S. Cl.
CPC ......... *H01M 8/04291* (2013.01); *B60L 50/72* (2019.02); *H01M 8/04156* (2013.01); *A01K 7/00* (2013.01); *B62D 25/2027* (2013.01); *H01M 2250/20* (2013.01)

(58) Field of Classification Search
CPC ........... A01K 7/00; B60L 50/72; B62D 25/20; B62D 25/2027; H01M 8/04291; H01M 8/04156; H01M 2250/20
See application file for complete search history.

(56) References Cited

U.S. PATENT DOCUMENTS

| 2,828,781 | A | * | 4/1958 | Hammack | B67D 3/0022 141/82 |
| 4,034,571 | A | * | 7/1977 | Bollinger | B60N 3/18 62/399 |
| 4,394,877 | A | * | 7/1983 | Whyte | F16N 31/002 224/400 |
| 5,823,598 | A | * | 10/1998 | Clare | B60J 10/60 92/144 |
| 6,129,401 | A | * | 10/2000 | Neag | B60N 3/08 296/183.1 |
| 6,966,593 | B2 | * | 11/2005 | Plentis | B60R 9/02 296/37.6 |

(Continued)

*Primary Examiner* — Nicolas A Arnett
(74) *Attorney, Agent, or Firm* — Fox Rothschild LLP

(57) ABSTRACT

Provided is a system for deploying a container from a vehicle. The system includes a container; a reservoir configured to store a substance to be dispensed to the container; and a deployment device configured to transition the container between a deployed position and a retracted position. In the deployed position, the container is placed external to the vehicle, and in the retracted position, the container is placed internal to the vehicle. The system may further include a dispensing device connected to the reservoir and configured to dispense the substance from the reservoir to the container. Preferably, the vehicle is a fuel cell electric vehicle (FCEV) including a fuel cell stack, and the substance includes wastewater exhaust form the fuel cell stack.

6 Claims, 11 Drawing Sheets

(56) References Cited

U.S. PATENT DOCUMENTS

| | | | | |
|---|---|---|---|---|
| 7,328,818 B2* | 2/2008 | Prabucki | ............... | B67D 3/0029 |
| | | | | 62/3.64 |
| 8,104,431 B2* | 1/2012 | Klenotiz | ................. | A01K 7/06 |
| | | | | 119/72 |
| 8,322,574 B1* | 12/2012 | Phillips | .................... | B60N 3/18 |
| | | | | 219/202 |
| 8,820,593 B2* | 9/2014 | Pesach | .................... | B67D 7/80 |
| | | | | 222/129 |
| 9,409,525 B2* | 8/2016 | Gillam | ................ | B62D 33/023 |
| 9,481,316 B2* | 11/2016 | Faruque | .................... | B60R 9/06 |
| 9,517,923 B2* | 12/2016 | Al-Hakim | ................ | B67D 1/10 |
| 9,615,540 B1* | 4/2017 | Mansour | ................... | A01K 7/00 |
| 10,562,458 B2* | 2/2020 | Mozurkewich | ......... | B60R 7/043 |
| 10,562,749 B2* | 2/2020 | Chivchyan | ............ | B67D 3/0009 |
| 11,034,393 B1* | 6/2021 | Ionescu | .............. | B62D 33/0273 |
| 11,440,479 B2* | 9/2022 | Salter | ........................ | B60P 7/15 |
| 11,919,764 B2* | 3/2024 | Mullenaux | ................ | E03B 3/28 |
| 11,951,892 B2* | 4/2024 | Baranyai | ................ | A47J 31/40 |
| 2003/0155160 A1* | 8/2003 | Nomura | ............ | H01M 8/04007 |
| | | | | 180/65.1 |
| 2014/0058559 A1* | 2/2014 | Haynes | ................. | A01K 15/02 |
| | | | | 119/57.7 |

* cited by examiner

CONTAINER DEPLOYMENT FROM VEHICLE

BACKGROUND

Technical Field

Embodiments of the present disclosure relate to systems for water container deployment from a vehicle and methods of using thereof.

Background

Pets including dogs commonly travel in vehicle with their owners. Pets are taken, for example, to run errands, on vacation trip, camping, picnic, outdoor recreation, or to assist the handicapped, for examples, people with vision impairment. Pets, however, require regular drinking water and having food for hydration and to maintain health.

Prior existing technologies include a vehicle "dog mode" where vehicles can be set to the dog mode to maintain a dog's health and safety while a driver is away, and a dog waits in the vehicle. Most commonly, the dog mode comprises operating air conditioning to prevent the vehicle cabin from overheating and the dog being harmed by heat. The dog mode, however, does not provide necessary water or food for a dog.

Water or food can be manually provided by a pet owner/driver to a pet, it requires the pet owner/driver to plan ahead and bring water or food. Changes in travel schedule can result in water or food being needed but not planned for (e.g., congestion or longer time at stops result in journey being extended and a pet needing water). A pet owner/driver can provide water or food inside or outside a vehicle during stops, water or food may spill or otherwise be wasted before a pet drinks.

The matters described in this background section are intended to promote an understanding of the background of the disclosure and may include matters that are not already known to those of ordinary skill in the art.

SUMMARY

The purpose and advantages of the present invention will be set forth in and apparent from the description that follows, as well as will be learned by practice of the invention. Additional advantages of the invention may be realized or obtained by the methods and systems particularly pointed out in the written description and claims hereof, as well as from the appended drawings.

It may be an object of embodiments of the disclosure to provide food or water during car travel. Food or water can be stored in a reservoir and dispensed to a container, which is transitioned between a deployed position and a retracted position so that food or water can be provided to pets. This system is aesthetically advantageous in that the container in a retracted position can be hidden inside a vehicle or incorporated into a vehicle, for example, a rear bumper or a running board, which makes the system visually compatible with a vehicle style and design.

An exemplary embodiment of the present disclosure provides a system for deploying a container from a vehicle. The system may include a container; a reservoir configured to store a substance to be dispensed to the container; and a deployment device configured to transition the container between a deployed position and a retracted position. In the deployed position, the container is placed external to the vehicle, and in the retracted position, the container is placed internal to the vehicle. The system may further include a dispensing device configured to dispense the substance from the reservoir to the container.

The vehicle may be a fuel cell electric vehicle (FCEV) including a fuel cell stack. The reservoir may be connected to the fuel cell stack, and the substance may include wastewater exhaust from the fuel cell stack.

In another exemplary embodiment, in the retracted position, a bottom of the container may not be substantially horizontal to a ground. In the deployed position, the bottom of the container may be substantially horizontal to a ground. In the deployed position, the wastewater is dispensed from the reservoir to the container by the dispensing device. The deployment device may be configured to rotate the container from the retracted position to the deployed position, and vice versa. The container may be rotated from the deployed position to the retracted position, the wastewater drains out from the container. The container may comprise a drain hole.

In another exemplary embodiment, in the retracted position, the container may be stored in a recess of the vehicle and substantially horizontal to the ground. In the deployed position, the container may extend out of the recess of the vehicle. The deployment device may be configured to horizontally drive the container from the retracted position to the deployed position, and vice versa. In the deployed position, the wastewater may be dispensed from the reservoir to the container by the dispensing device. The deployment device may include an arm to which the container is engaged.

In another exemplary embodiment, the container may be collapsible. The recess may have less volume than the container before collapsed, and when the container is driven to the retracted position from the deployed position, the container may be collapsed, thereby pushing out the wastewater in the container.

The substance may be food, beverage, or both.

The container may be internally partitioned.

The substance may further include food, beverage other than the wastewater, or both.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
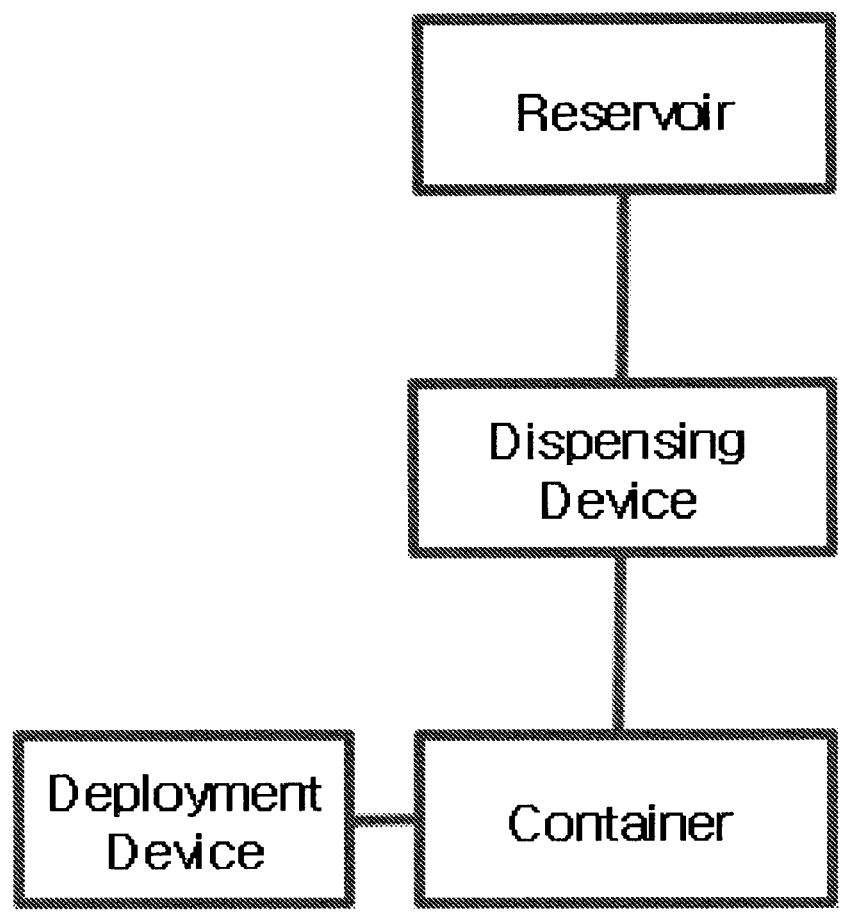
FIG. 1 depicts a schematic diagram of a system for deploying a container from a vehicle, according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence, or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

As used herein, the term "engages" and its variations refer to the attaching, holding, clamping, gripping, grasping, securing, bringing, or coming together, and/or interlocking of various items and/or components.

As used herein, the term "substantially" and its variations as used herein are a broad term, and are to be given its ordinary and customary meaning to a person of ordinary skill in the art (and is not to be limited to a special or customized meaning), and refer without limitation to being largely but not necessarily wholly that which is specified. Alternatively, the term "substantially" and its variations mean at least 80%, 90% or 95%.

As used herein, the term "food" and its variations refer to any nutritious substance that animals or people can eat to maintain life and growth.

As used herein, the term "beverage" and its variations refer to any substance that animals or people can drink to maintain life and growth.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 depicts a schematic diagram of a system for deploying a container from a vehicle, according to an exemplary embodiment of the present disclosure.

As shown in FIG. 1, a system for deploying a container from a vehicle is provided. The system may include a container; a reservoir configured to store a substance to be dispensed to the container; and a deployment device configured to transition the container between a deployed position and a retracted position. In the deployed position, the container may be placed external to the vehicle, and in the retracted position, the container may be placed internal to the vehicle. The system may further include a dispensing device configured to dispense the substance from the reservoir to the container. The substance may be food (e.g., dog food, dog supplement), beverage (e.g., water, dog beverage) or both.

The container may have more than one internal space. The container may be internally partitioned. For example, the container may have two partitioned internal spaces each for food and beverage, respectively. Alternatively, the system may have more than one container, and food and beverage may be distributed to each container, respectively. The container may have a device that aids a pet in accessing the substance inside the container.

It may be possible for a user to manually store beverage or food in the reservoir. When both beverage and food are dispensed, there may be more than one reservoir. For example, the first reservoir may store beverage, and the second reservoir may store food. It may be possible for one reservoir partitioned internally to store beverage and food separately.

Similarly, there may be more than one dispensing device that dispense beverage and food, respectively. It may be possible for one dispensing device partitioned internally to dispense beverage and food separately. For a multi-reservoirs system, each of the reservoirs may be suitably connected to a container or containers. For example, a reservoir containing beverage may be configured to dispense the liquid into one container, and a reservoir containing food may be configured to dispense the food into the other container. Alternatively, each of the reservoirs may be connected to the same container so that beverage or food in each of the reservoirs can be mixed in the same container. The reservoir(s) may be equipped with a sensor that monitors what is stored in it and if so, how much is stored in it.

The dispensing device may include a valve or a nozzle. In dispensing a substance, a valve or a nozzle may control flow between the reservoir and the container. The dispensing device may further include a pipe, tube, channel, or conduit installed between the reservoir and the container. The valve or nozzle may be placed at any point of the pipe, tube, channel, or conduit. Once the valve or nozzle is opened, the substance from the reservoir may start filling the container, if the substance is available.

The dispensing device may further include a filter, preferably, at the end of the water pipe to filter the substance. The dispensing device may further include a purifying device, such as a UV light emitter. The dispensing device may further include a sensor that checks if the substance is safe to drink or eat for a pet. The sensor may indicate if the substance is safe to drink or eat for a person in emergency.

The deployment device may include means for moving the container between the retracted and deployed positions. The deployment device may further include a motor and a gear.

Figure 2:
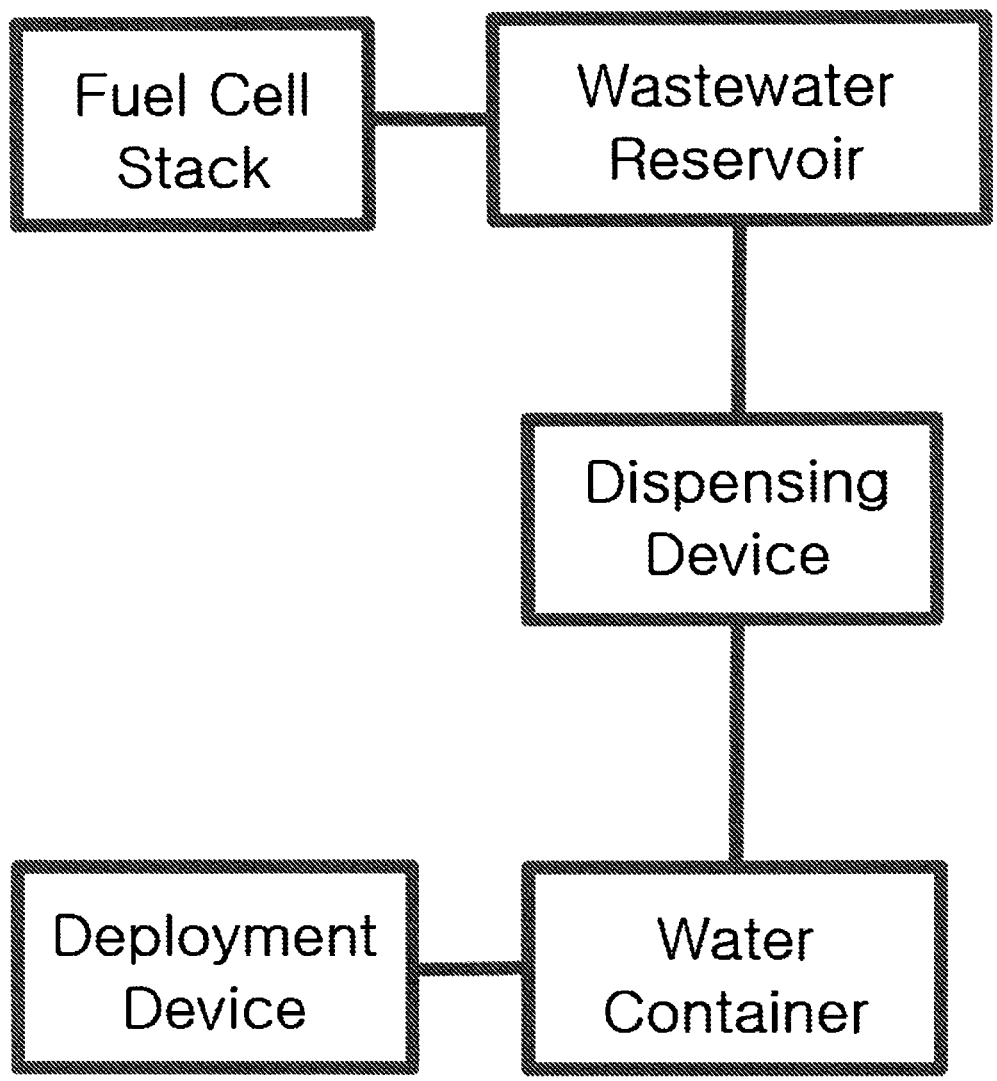
FIG. 2 depicts a schematic diagram of a system for deploying a water container from a fuel cell electric vehicle (FCEV), according to an exemplary embodiment of the present disclosure.

FIG. 2 depicts a schematic diagram of a system for deploying a water container from a fuel cell electric vehicle (FCEV), according to an exemplary embodiment of the present disclosure.

As shown in FIG. 2, a system for deploying a container from a fuel cell electric vehicle (FCEV) including a fuel cell stack is provided. The system may include a water container; a wastewater reservoir configured to store wastewater to be dispensed to the water container; and a deployment device configured to transition the water container between a deployed position and a retracted position. In the deployed position, the water container is placed external to the vehicle, and in the retracted position, the water container is placed internal to the vehicle. The system may further include a dispensing device configured to dispense the wastewater from the wastewater reservoir to the water container. The wastewater reservoir may be connected to the fuel cell stack and configured to receive wastewater from the fuel cell stack.

The water container may be internally partitioned. The water container may have more than one internal space. For example, the water container may have two partitioned internal spaces each for food and wastewater, respectively. Alternatively, the system may have more than one water container. The water container may have a device that aids a pet in accessing the wastewater inside the water container.

It is possible for a user to manually store food or beverage other than wastewater in the reservoir. In the case both beverage (wastewater or beverage manually added by a user) and food are dispensed, there may be more than one reservoir. For example, the first reservoir may store wastewater, and the second reservoir may store food. Alternatively, there may be three reservoirs. The first reservoir may store wastewater, the second reservoir may store beverage other than wastewater, and the third reservoir may store food. For a multi-reservoirs system, each of the reservoirs may be suitably connected to a container or containers. For example, reservoirs containing wastewater and beverage other than water may be configured to dispense the liquids into one container (into the same internal space or separate internal spaces), and a reservoir containing food may be configured to dispense the food into the other container. Alternatively, a reservoir containing wastewater may be configured to dispense the liquid into one container, a reservoir containing beverage may be configured to dispense the liquid into another container, and a reservoir containing food may be configured to dispense the food into the other container. Alternatively, each of the reservoirs may be connected to the same container so that beverage or food in each of the reservoirs can be mixed in the same container.

The reservoir(s) may be equipped with a sensor that monitors what is stored in it and if so, how much is stored in it.

It may be possible for one reservoir partitioned internally to store wastewater and food separately. Similarly, there may be more than one dispensing device that dispense the wastewater and food, respectively. It may be possible for one dispensing device partitioned internally to dispense wastewater and food separately.

The dispensing device may include a valve or a nozzle. In dispensing a substance, a valve or a nozzle may control flow between the reservoir and the container. The dispensing device may further include a pipe, tube, channel, or conduit installed between the reservoir and the container. The valve or nozzle may be placed at any point of the pipe, tube, channel, or conduit. Once the valve or nozzle is opened, the substance from the reservoir may start filling the container, if the substance is available.

The dispensing device may further include a filter, preferably, at the end of the water pipe to filter the substance. The dispensing device may further include a purifying device, such as a UV light emitter. The dispensing device may further include a sensor that checks if the substance is safe to drink or eat for a pet. The sensor may indicate if the substance is safe to drink or eat for a person in emergency.

The deployment device may include means for moving the container between the retracted and deployed positions. The deployment device may further include a motor and a gear.

FIGS. 3A-3D depict a deploying and retracting action of a container from a vehicle by rotation, according to an exemplary embodiment of the present disclosure.

Figure 3A:
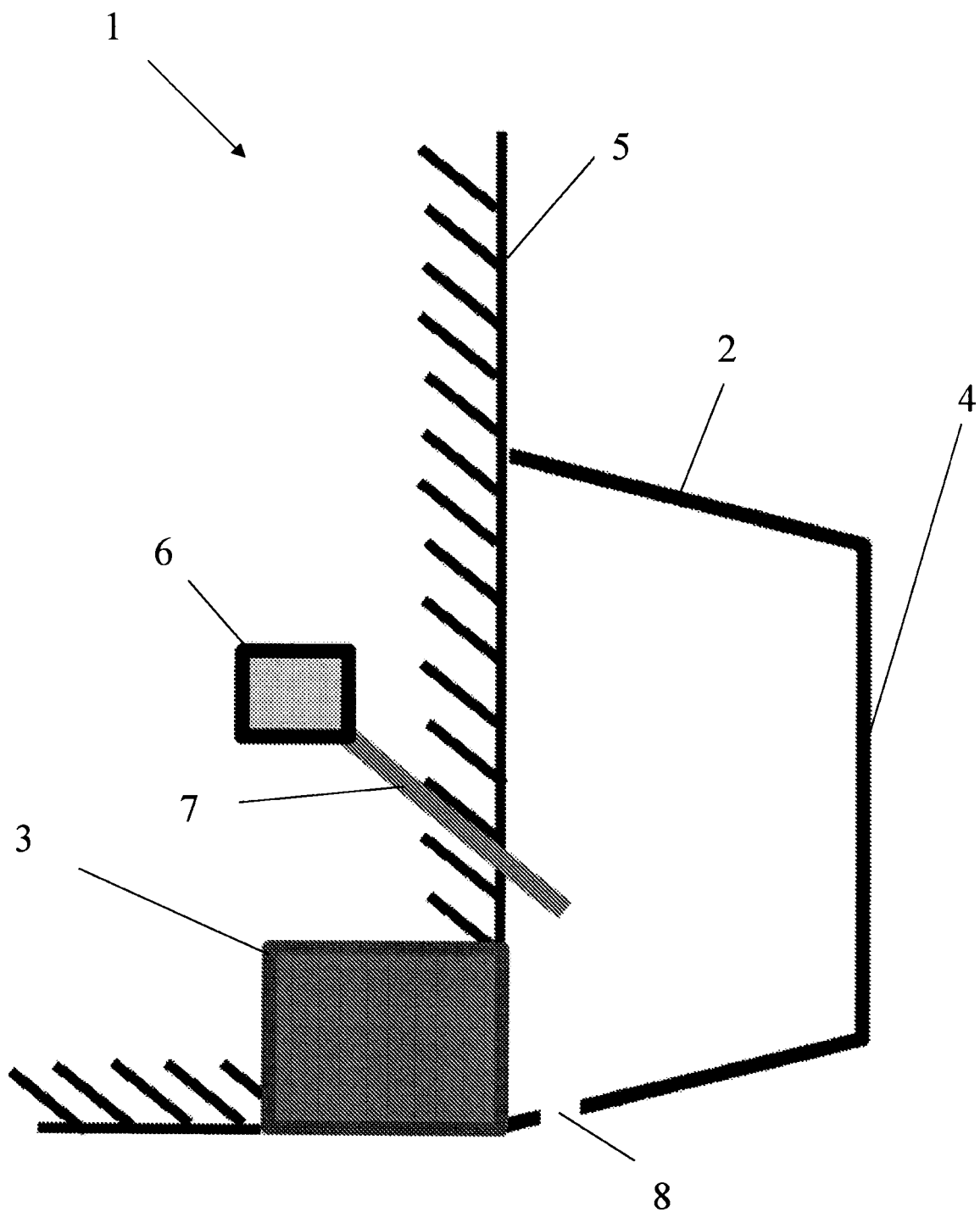
FIGS. 3A-3D depict a deploying and retracting action of a container from a vehicle by rotation, according to an exemplary embodiment of the present disclosure.

In FIGS. 3A-3D, a system 1 may include a water container 2; a water reservoir (not shown) configured to store water to be dispensed to the water container 2; and a deployment device 3 configured to transition the water container 2 between a deployed position and a retracted position. As shown in FIG. 3A, the water container 2 may be placed in a retracted position. In the retracted position, a bottom 4 of the water container 2 may not be substantially horizontal to a ground. Preferably, the bottom 4 of the water container 2 may be substantially vertically to a ground. Alternatively, the bottom 4 of the water container 2 may be adjoined or contacted to a portion of the vehicle 5. Alternatively, the water container 2 may be in a position most or all of the water inside the water container can be drained through a drain hole 8. While in FIG. 3A, the water container 2 is placed external to the vehicle 5, the water container 2 may be preferably placed inside the vehicle in the retracted position. The system 1 may further include a dispensing device such as a valve or a nozzle 6 and a water pipe 7 configured to dispense the water from the water reservoir to the water container 2.

In dispensing a substance (here, water), the valve or a nozzle 6 may control flow between the reservoir and the water container 2. The valve or nozzle may be placed at any point of the pipe, tube, channel, or conduit 7. The dispensing device may further include a filter, preferably, at the end of the water pipe 7 to filter the water. The dispensing device may further include a purifying device, such as a UV light emitter. The dispensing device may further include a sensor that checks if the water is safe to drink for a pet. The sensor may indicate if the substance is safe to drink or eat for a person in emergency.

The deployment device 3 may include means for moving the water container 2 between the retracted and deployed positions. The deployment device 3 may further include a motor and a gear.

Figure 3B:
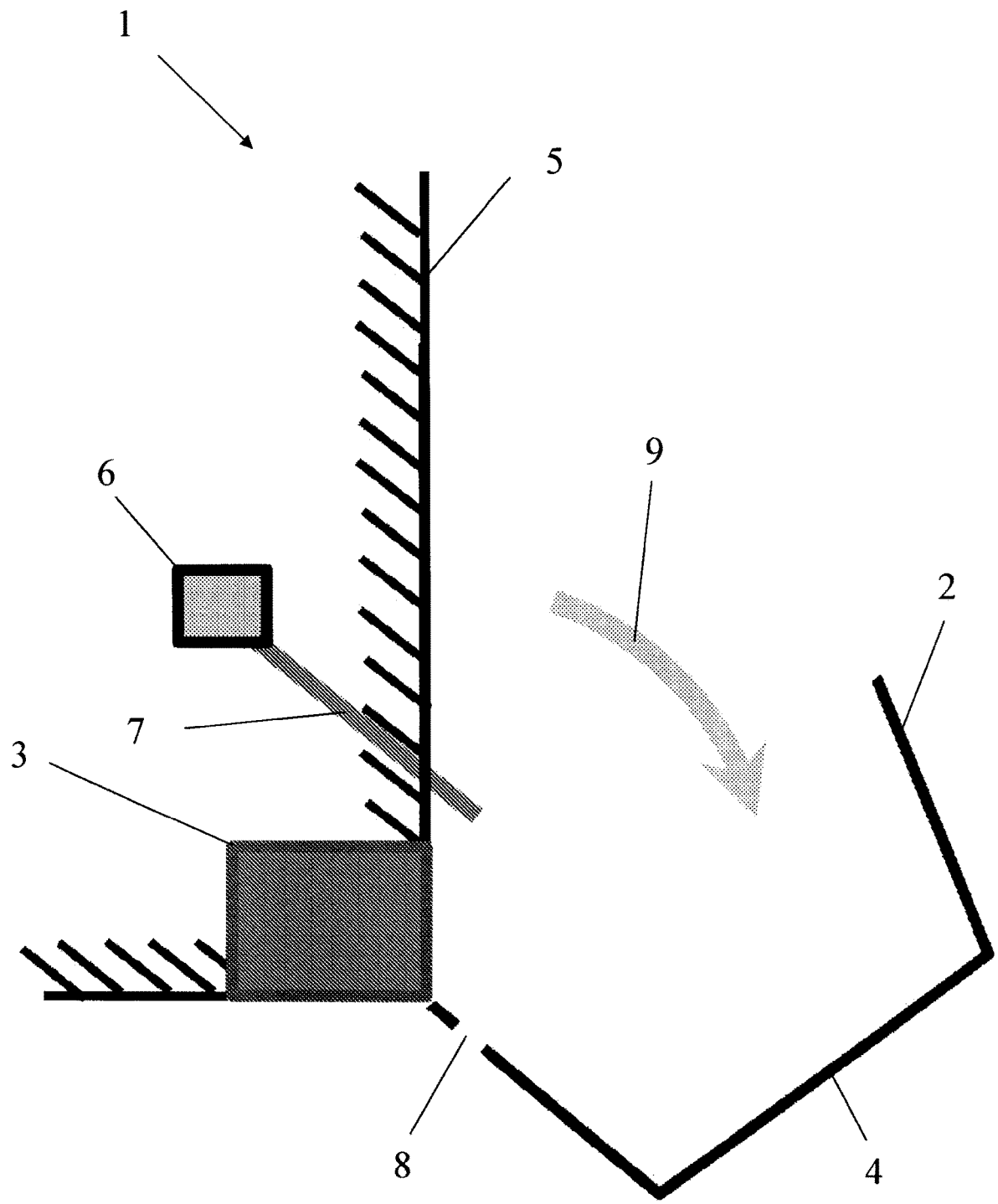

As shown in FIG. 3B, the deployment device 3 may be activated to start rotating the water container 2 from the retracted position to the deployed position in a direction 9, in response to a user action such as pushing a button on the vehicle 5 adjacent to the water container 2, pressing a button on a key fob, a smartphone, or an infotainment system. Alternatively, the deployment device 3 may be activated in response to detecting a foot wave at or under the water container 2. Alternatively, the deployment device 3 may be activated in response to a pet having been trained to press an activation button and deploy the water container 2. The deployment device 3 may rotate the water container 2 about a hinge from the retracted position (e.g., a vertical position) to the deployed position (e.g., a horizontal position). In the deployed position, the water container 2 may be placed external to the vehicle 5. In the deployed position, the bottom 4 of the water container 2 may be substantially horizontal to a ground. Alternatively, the water container 2 may be in a position most or all of the water inside the water container 2 can be kept inside the water container 2.

The water container 2 may have a device that aids a pet in drinking water inside the water container 2. The water container 2 may be slightly inclined toward the pet so that the pet can access the water easily.

When rotating the water container 2 to the deployed position, the system 1 may alert a pet by making an alarming sound or a voice recorded from a user.

Figure 3C:
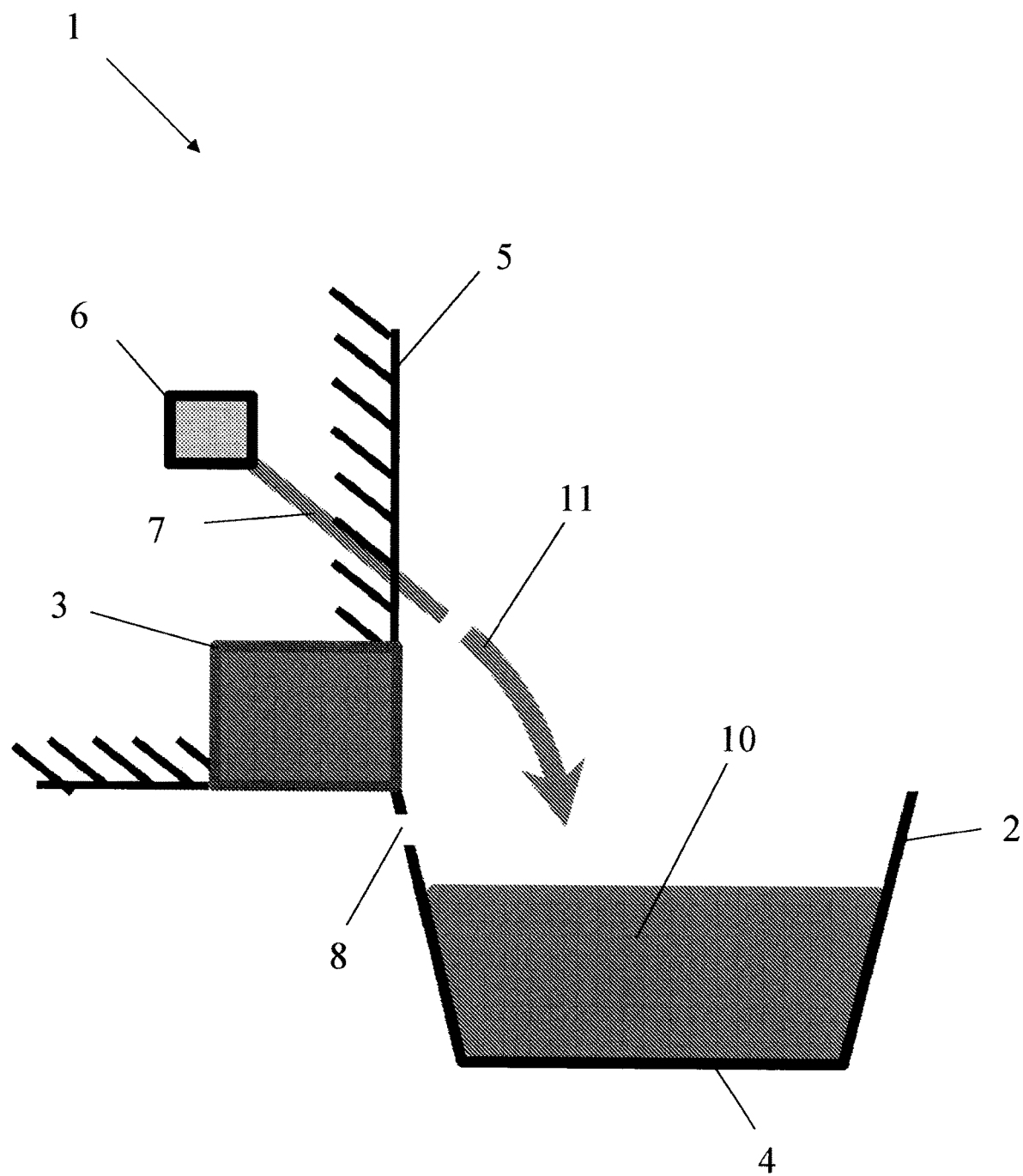

As shown in FIG. 3C, in the deployed position, the bottom 4 of the water container 2 may be substantially horizontal to a ground. Alternatively, the water container 2 may be in a position most or all of the water inside the water container 2 can be kept inside the water container 2. In the deployed position, the water 10 may be dispensed in a direction 11 from the reservoir to the water container 2 by the dispensing device such as the valve or the nozzle 6 and the water pipe 7. The valve 6 may be closed, preferably after time period calculated to provide sufficient water to fill the water container 10 just below the drain hole 2. The system may allow a user or a pet to refill the water container 10 by pushing a separate button.

The drain hole 8 may be above a level of the water 10. In the deployed position, a pet may now access and drink the water 10 inside the water container 2.

Figure 3D:
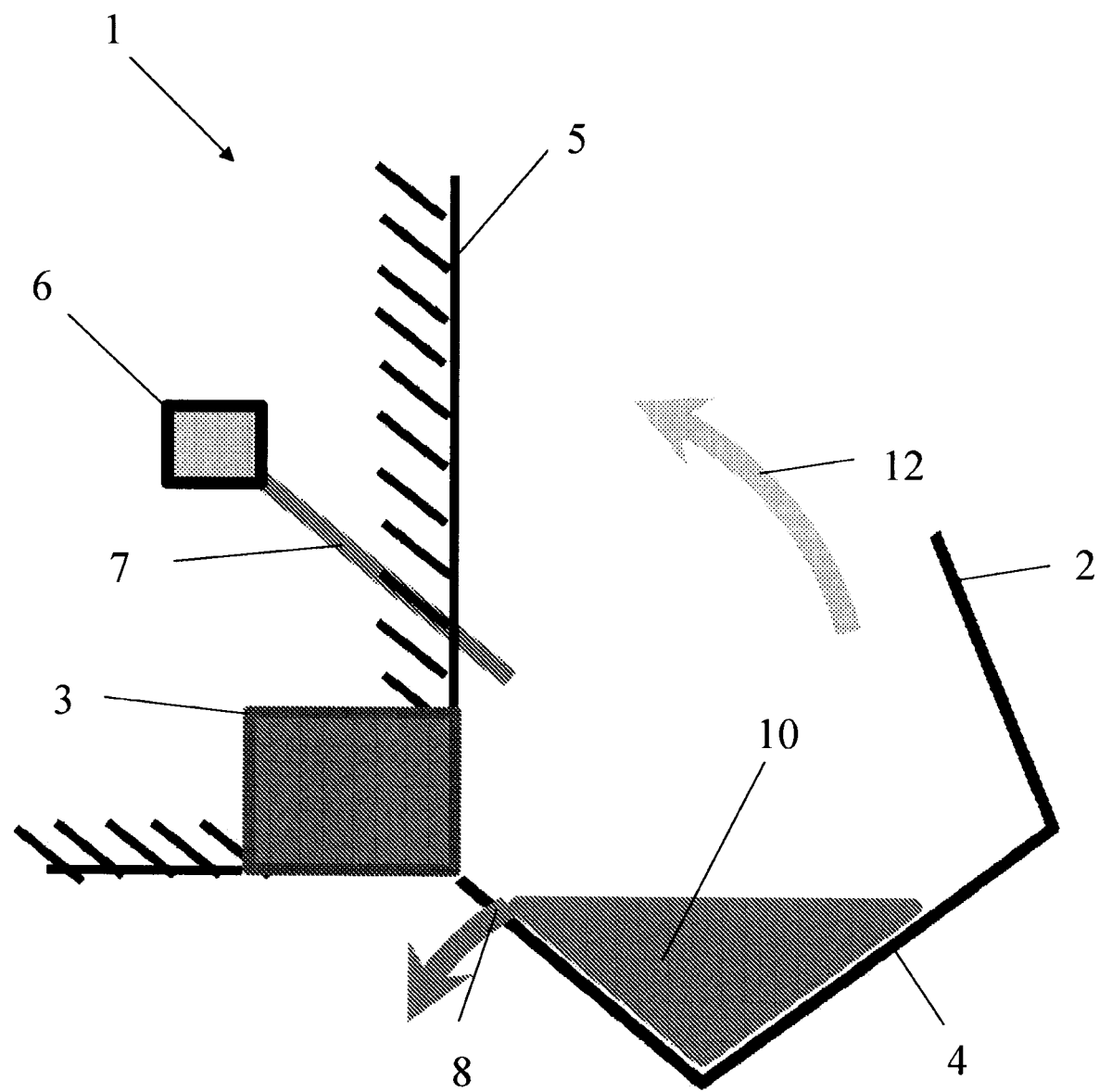

As shown in FIG. 3D, the water container 2 may be rotated back from the deployed position to the retracted position in a direction 12, in response to a user action such as pushing a button on the vehicle 5 adjacent to the water container 2, pressing a button on a key fob, a smartphone, or an infotainment system. Alternatively, the retraction may be activated in response to detecting a foot wave at or under the water container 2. Alternatively, the retraction may be activated in response to a pet having been trained to press an activation button and retract the water container 2. Alternatively, the water container 2 may retract after preset period of time. When the water container 2 is rotated back to the retracted position, the water 10 may drain out from the water container 2 through the drain hole 8.

The rotating speed may be preset to make sure the water 10 may properly and sufficiently drain out from the water container through the drain hole 8. The water container 2 may be rotated back to the initial retracted position. Preferably, an interlock or sensor may be provided such that vehicle 5 cannot be put into drive while the water container 2 is deployed or not completely retracted. The system 1 may allow a user to manually rotate back to the retracted position, with or without malfunction of the deployment device 3. The vehicle 5 may further have a sensor that monitors if a pet is between the vehicle body and the water container 2 to prevent the pet from being stuck in between.

The water container 2 may be removable from the deployment device 3 so that a user can clean or substitute it.

Like all other embodiments, this embodiment is not limited to a dog but is applicable to any other suitable pets.

Like all other embodiments, the vehicle 5 may be a fuel cell electric vehicle, and the water may be wastewater from the FCEV.

Like all other embodiments, the system 1 may have more than one container; more than one reservoir; and more than one dispensing device. Some of the containers, reservoirs and dispensing devices may be for dispensing food.

Figure 4A:
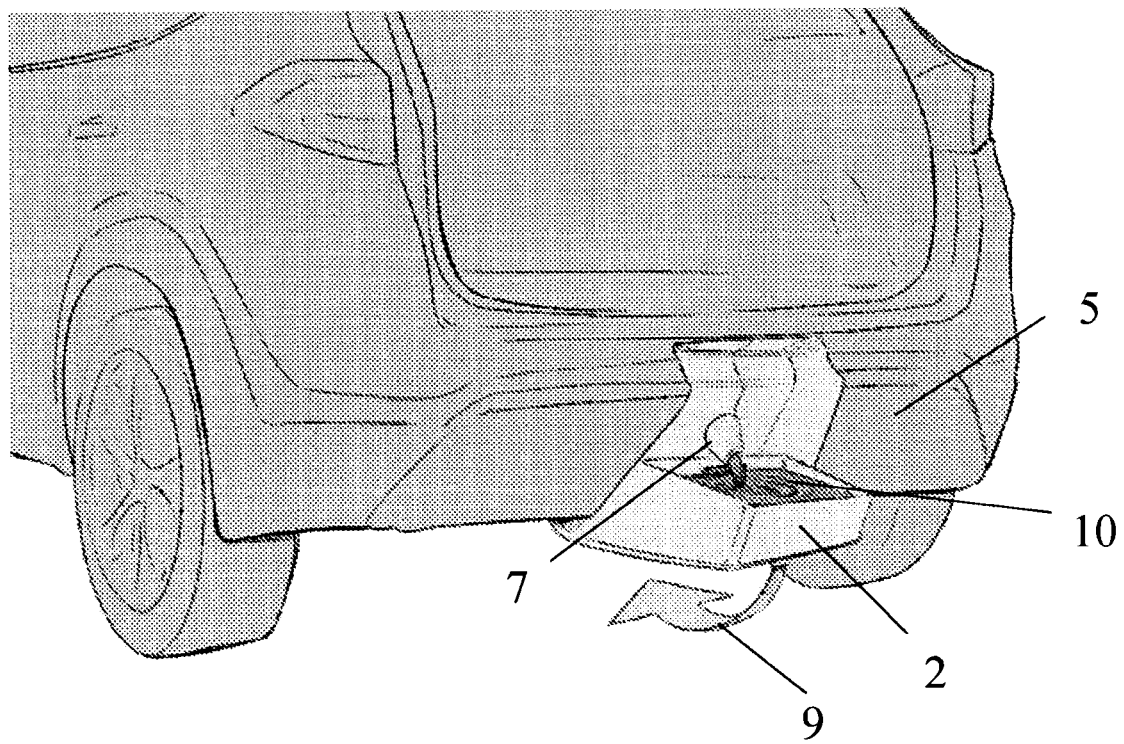
FIGS. 4A-4B depicts a container of a vehicle after and before deploying a container, according to an exemplary embodiment of the present disclosure.
Figure 4B:
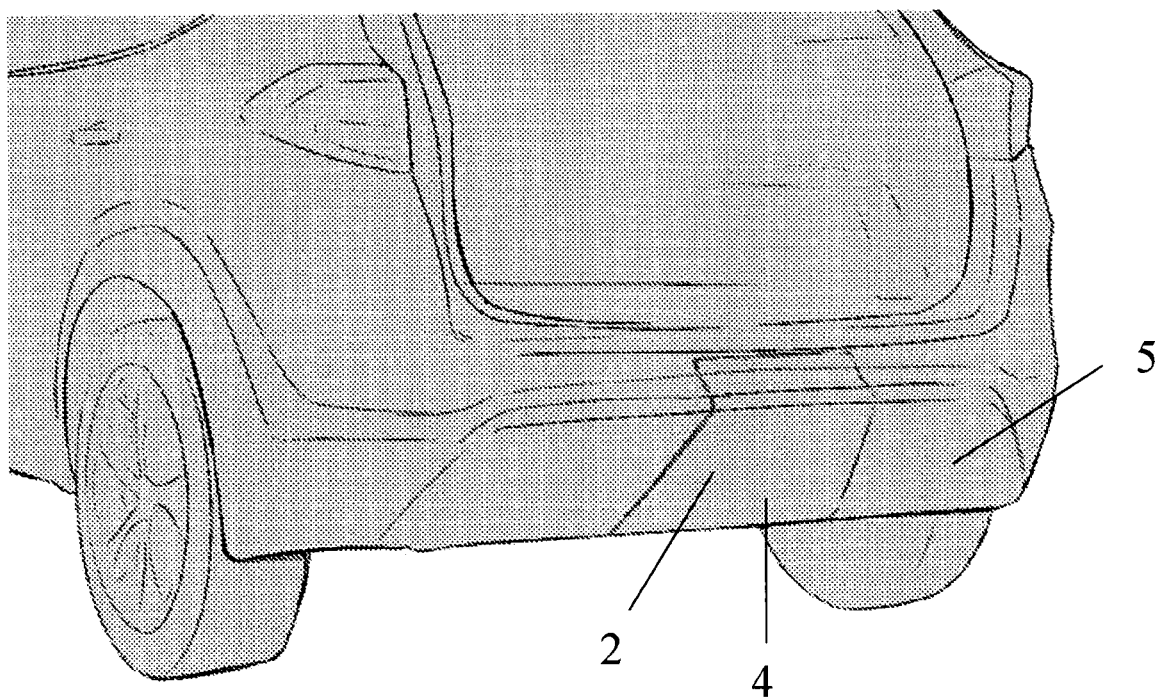

FIGS. 4A-4B depicts a container of a vehicle after and before deploying a container, according to an exemplary embodiment of the present disclosure.

As shown in FIG. 4A, the water container 2 may be rotated from the retracted position to the deployed position in a direction 9. The bottom 4 of the water container 2 may be substantially horizontal to a ground. In the deployed position, the water 10 is dispensed from the reservoir to the water container 2 by the dispensing device such as the valve or the nozzle and the water pipe 7.

As shown in FIG. 4B, the water container 2 may be in the retracted position. The water container in a retracted position may be hidden inside the vehicle 5 or incorporated into the vehicle 5, for example, a rear bumper, as shown here, or a running board, which makes the system 1 visually compatible with the vehicle style and design. The bottom of the water container 2 may form a smooth and flat surface with the rear bumper of the vehicle 5 so that it can visually blend with the vehicle style and design.

Like all other embodiments, the vehicle 5 may be a fuel cell electric vehicle, and the water may be wastewater from the FCEV.

Figure 5:
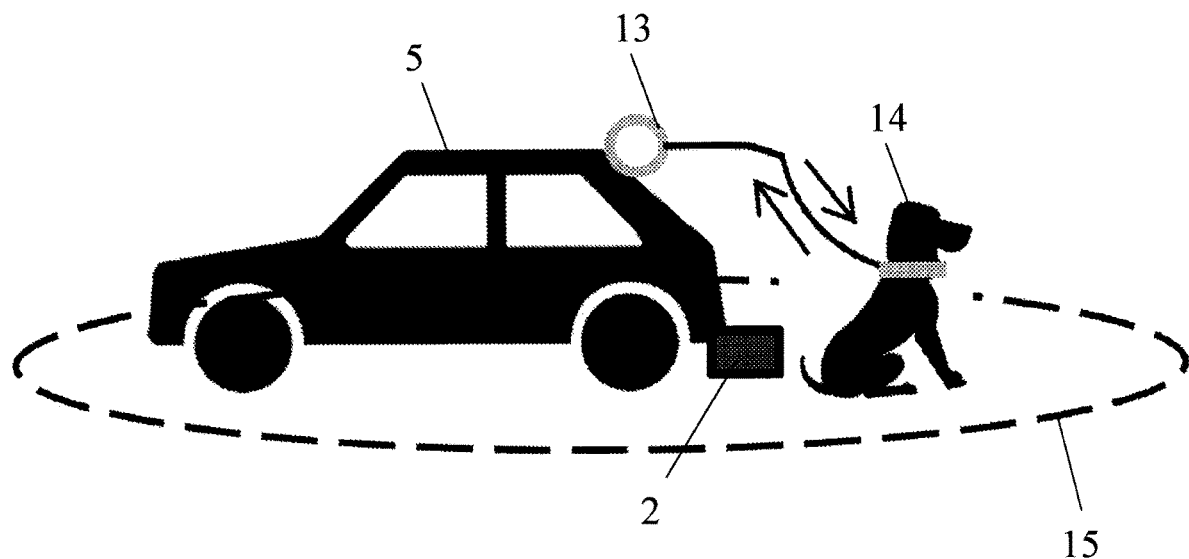
FIG. 5 illustrates a vehicle deploying a container for a dog leashed to the vehicle, according to an exemplary embodiment of the present disclosure.

FIG. 5 illustrates a vehicle deploying a container for a dog leashed to the vehicle, according to an exemplary embodiment of the present disclosure.

As shown in FIG. 5, the container 2 of the vehicle 5 may be deployed out of the vehicle 5 to a dog 14 leashed to the vehicle through a retractable dog leash 13. The dog leash 13 may be integrated to a dedicated slot on top of the trunk. The dog leash 13 may be located on any suitable part of the vehicle 5. The combination of the container deployment system and the dog leash may safely provide the dog 12 an access to water or food at any time during a stop and allow a user to leave the vehicle 5 and return later.

The dog leash 13 may be a smart adaptive leash system, and when the system is activated, the vehicle may automatically or upon a user's command start deploying the water container 2. Similarly, when the system is deactivated, the vehicle may automatically or upon a user's command start retracting the water container 2.

Like all other embodiments, this embodiment is not limited to a dog but is applicable to any other suitable pets.

Like all other embodiments, the vehicle 5 may be a fuel cell electric vehicle, and the water may be wastewater from the FCEV.

Figure 6:
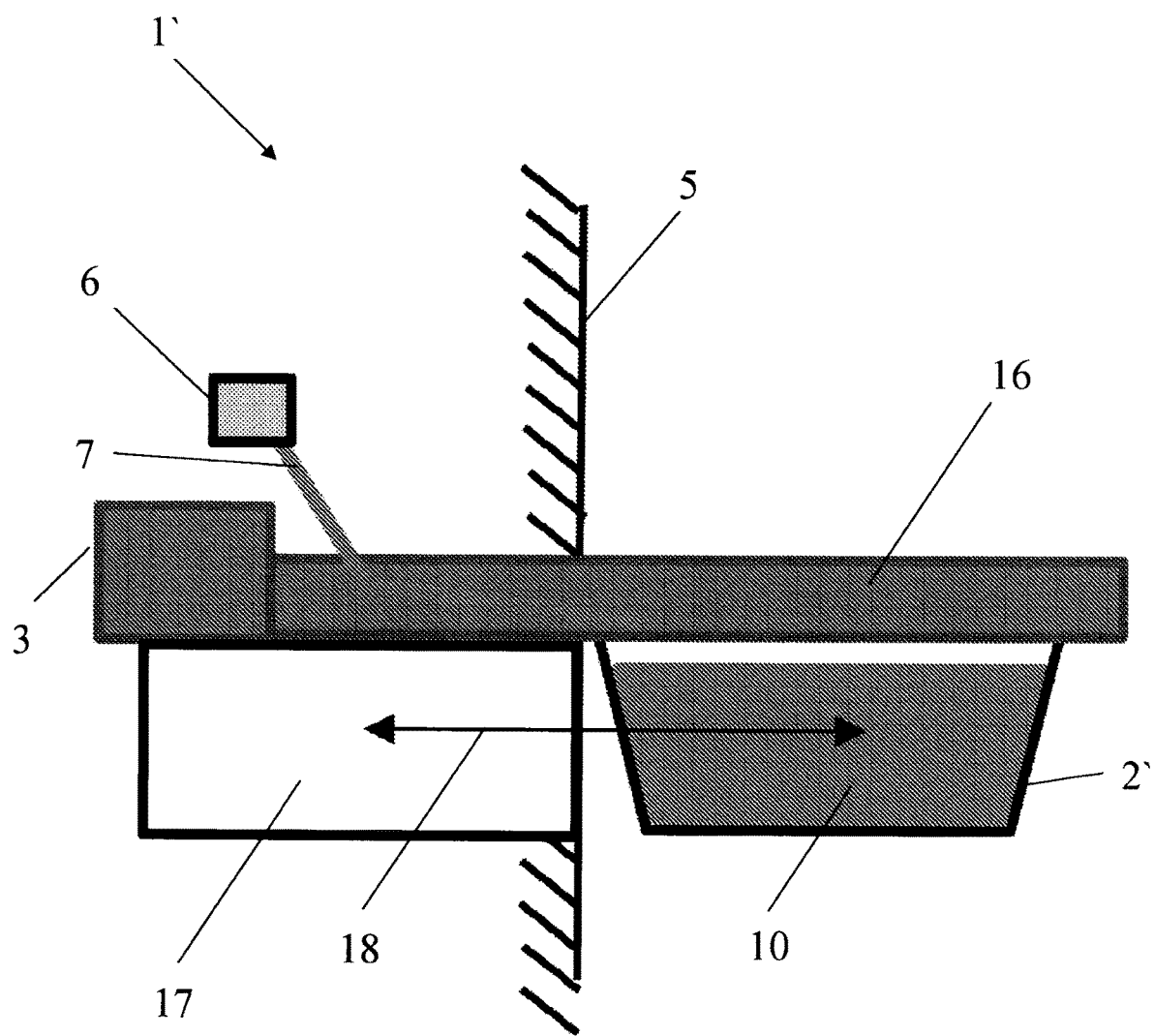
FIG. 6 depicts a deploying and retracting action of a container from a vehicle by an arm's horizontal movement from and toward a recess, according to an exemplary embodiment of the present disclosure.

FIG. 6 depicts a deploying and retracting action of a container from a vehicle by an arm's horizontal movement from and toward a recess, according to an exemplary embodiment of the present disclosure.

In the embodiment described in FIG. 6, a container 2' of a system 1' may be deployed or retracted from the vehicle 5 by an arm 16's horizontal movement from and toward a recess 17 in a direction 18. Once deployed, the water 10 is dispensed from the reservoir to the water container 2' by the dispensing device such as the valve or the nozzle 6 and the water pipe 7. The water pipe 7 may be routed in the arm 16. The water container 2' may not have a drain hole because it is driven horizontally from and toward the recess 17. The recess 17 is spacious enough to receive or house the water container 2'. Once a pet finishes drinking water, any left water may be manually removed by a user.

The water container 2' may be removable from the deployment device 3 so that a user can clean or substitute it.

The water container 2' may have a device that aids a pet in drinking water inside the water container 2'. The water container 2' may be slightly inclined toward the pet so that the pet can access the water easily.

When driving the water container 2' to the deployed position, the system 1' may alert a pet by making an alarming sound or a voice recorded from a user.

The water container 2' may transition from the deployed position to the retracted position or vice versa, in response to a user action such as pushing a button on the vehicle 5 adjacent to the water container 2', pressing a button on a key fob, a smartphone, or an infotainment system. Alternatively, the transition may be activated in response to detecting a foot wave at or under the water container 2'. Alternatively, the transition may be activated in response to a pet having been trained to press an activation button and transition the water container 2'. Alternatively, the water container 2' may retract after preset period of time.

Like all other embodiments, this embodiment is not limited to a dog but is applicable to any other suitable pets.

Like all other embodiments, the vehicle 5 may be a fuel cell electric vehicle, and the water may be wastewater from the FCEV.

Like all other embodiments, the system 1' may have more than one container; more than one reservoir; and more than one dispensing device. Some of the containers, reservoirs and dispensing devices may be for dispensing food.

Figure 7A:
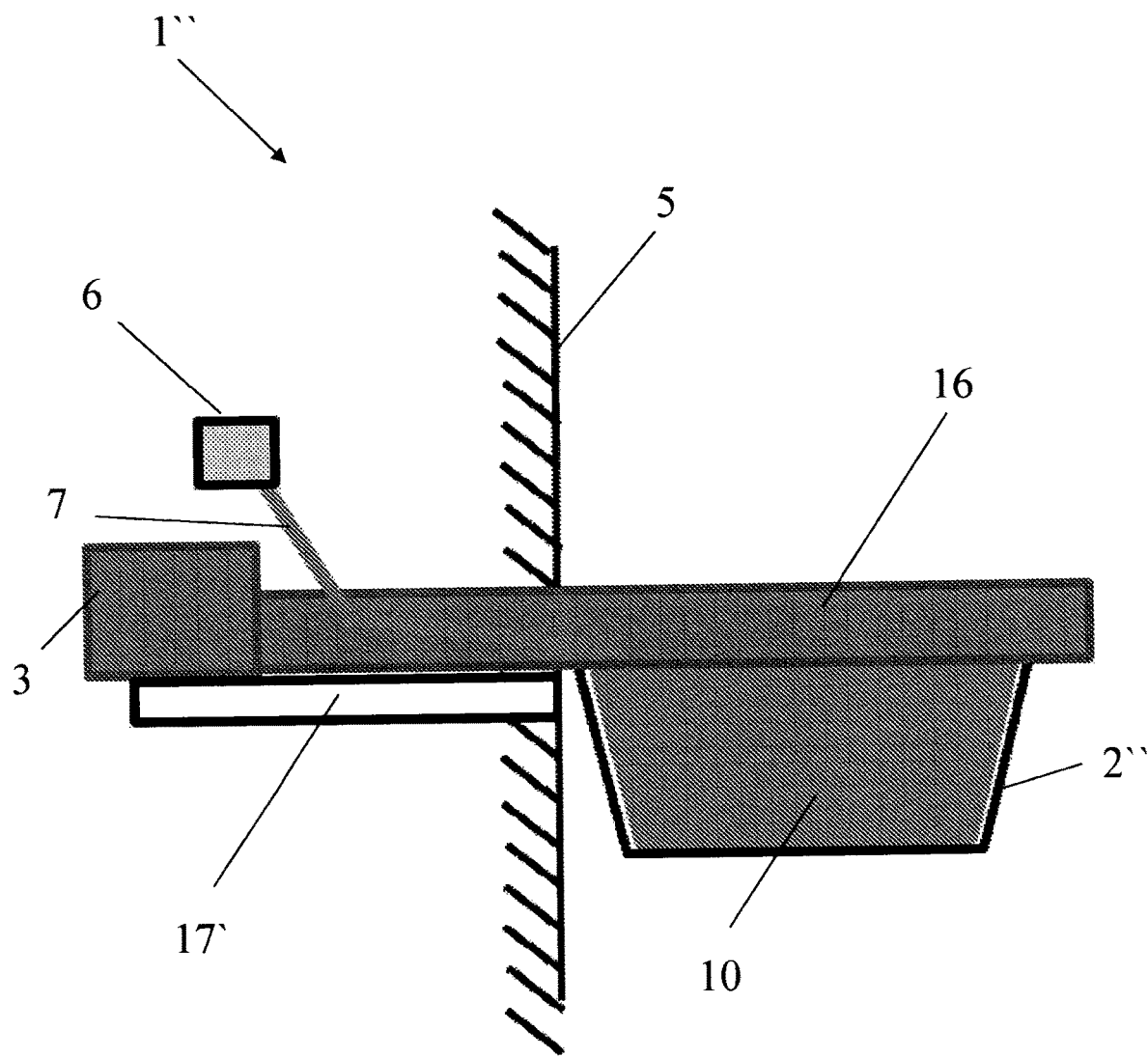
FIGS. 7A-7B depict a deploying and retracting action of a container from a vehicle by an arm's horizontal movement from and toward a slot, according to an exemplary embodiment of the present disclosure.
Figure 7B:
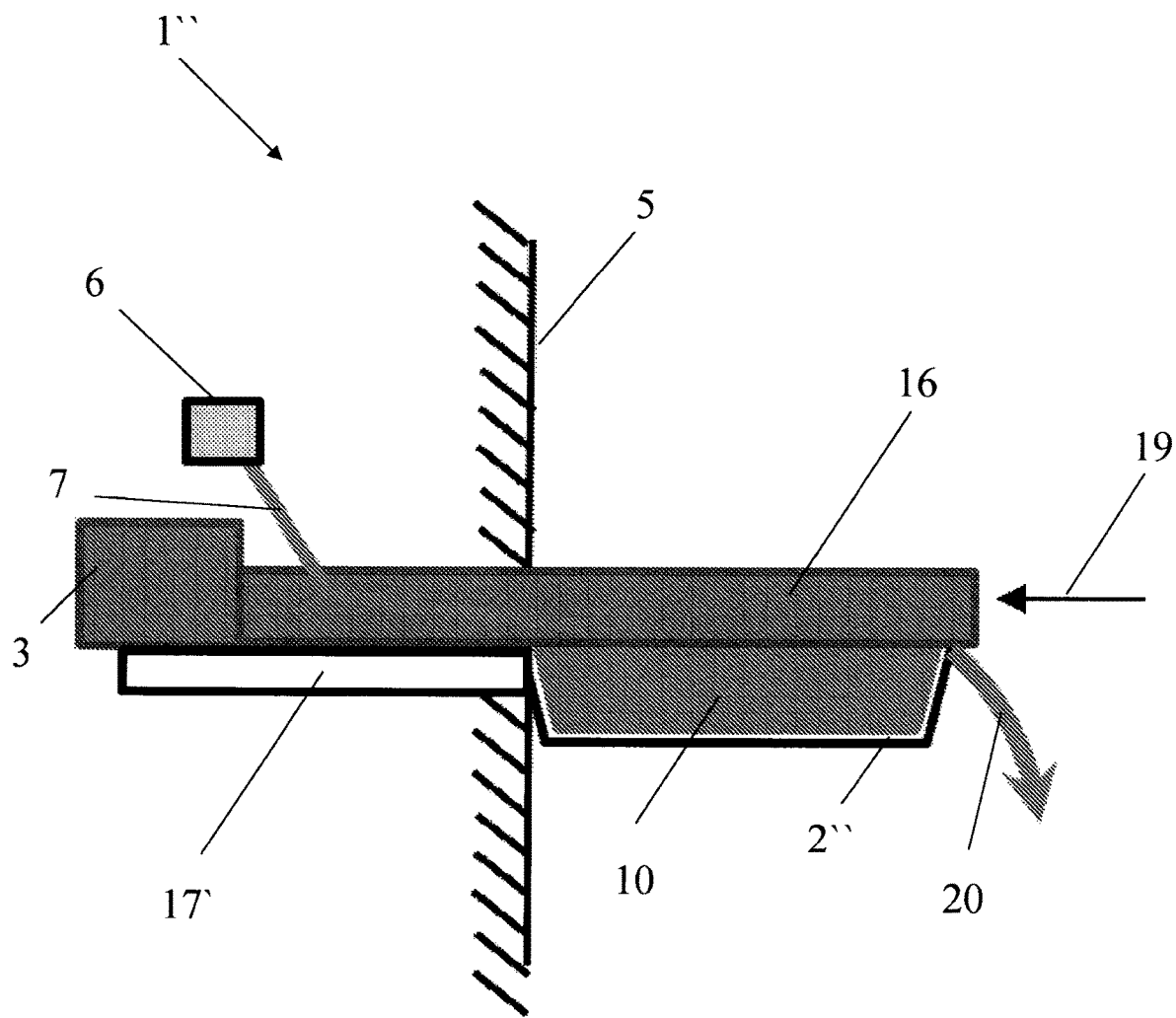

FIGS. 7A-7B depict a deploying and retracting action of a container from a vehicle by an arm's horizontal movement from and toward a slot, according to an exemplary embodiment of the present disclosure.

The container 2" of the system 1" may be collapsible. The recess 17 may have less volume than the container 2" before collapsed, and when the container 2" is driven to the retracted position from the deployed position in a direction 19, the container 2" may be collapsed, thereby pushing out the water in the container 2".

The water container 2" may be removable from the deployment device 3 so that a user can clean or substitute it.

The water container 2' may have a device that aids a pet in drinking water inside the water container 2". The water container 2" may be slightly inclined toward the pet so that the pet can access the water easily.

When driving the water container 2" to the deployed position, the system 1" may alert a pet by making an alarming sound or a voice recorded from a user.

The water container 2" may transition from the deployed position to the retracted position or vice versa, in response to a user action such as pushing a button on the vehicle 5 adjacent to the water container 2", pressing a button on a key fob, a smartphone, or an infotainment system. Alternatively, the transition may be activated in response to detecting a foot wave at or under the water container 2". Alternatively, the transition may be activated in response to a pet having been trained to press an activation button and transition the water container 2'. Alternatively, the water container 2" may retract after preset period of time.

Like all other embodiments, this embodiment is not limited to a dog but is applicable to any other suitable pets.

Like all other embodiments, the vehicle 5 may be a fuel cell electric vehicle, and the water may be wastewater from the FCEV.

Like all other embodiments, the system 1" may have more than one container; more than one reservoir; and more than one dispensing device. Some of the containers, reservoirs and dispensing devices may be for dispensing food.

In another embodiment, vehicles, preferably FCEVs, are provided that comprise a system for deploying and retracting a container from the vehicles as disclosed herein.

Although exemplary embodiments of the present disclosure have been described for illustrative purposes, those skilled in the art will appreciate that various modifications, additions, and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for deploying a container from a vehicle, the system comprising:
   a container;
   a reservoir configured to store a substance to be dispensed to the container;
   a dispensing device configured to dispense the substance from the reservoir to the container; and
   a deployment device configured to route the container between a deployed position and a retracted position and vice versa;
   wherein in the deployed position, the container is placed external to the vehicle, and in the retracted position, the container is placed internal to the vehicle,
   wherein the vehicle is a fuel cell electric vehicle (FCEV) comprising a fuel cell stack;
   wherein the reservoir is connected to the fuel cell stack, and the substance comprises wastewater exhaust from the fuel cell stack;
   wherein, in the retracted position, a bottom of the container is not substantially horizontal to a ground;
   wherein, in depth position, the bottom of the substantially horizontal to a ground and the wastewater d from the reservoir to the container by the dispensing device; and
   wherein, when the container is rotated from the deployed position to the retracted position, the water drains out from the container.

2. The system of claim 1, wherein the container comprises a drain hole.

3. The system of claim 1, wherein the substance is food, beverage, or both.

4. The system of claim 1, wherein the container is internally partitioned.

5. The system of claim 1, wherein the substance further comprises food, beverage other than the wastewater, or both.

6. A system for deploying a container from a vehicle, the system comprising:
   contain that is collapsible;
   a reservoir configured to store a substance to be dispensed to the container, a dispensing device configured to dispense the substance from the reservoir to the container, a deployment device including an arm to which the container is engaged and configured to transition the container between a deployed position and a retracted position;

wherein in the deal a container is placed external to the vehicle, and in the retracted position, the contain r is placed internal to the vehicle;

wherein the vehicle is a fuel cell electric vehicle (FCEV) comprising a fuel cell stack;

wherein the reservoir is connected to the fuel cell stack, and the substance comprises wastewater exhaust from the fuel cell stack;

wherein, in the retracted position, the container is stored in a recess of the vehicle and substantially horizontal to the ground;

wherein, in a deployed position, the container extends out of the recess of the vehicle;

wherein the deployment de is con red to horizontally drive container from the retracted position to the deployed position, and vice versa, wherein, in the deployed position, the wastewater is dispensed from the reservoir to the container by the dispensing device, and wherein the recess has less volume than the container before collapsed and, when the container is driven to the retracted position from the deployed position, the container is collapsed, thereby pushing out the wastewater in the container.

* * * * *